United States Patent
Salman et al.

(10) Patent No.: US 7,331,727 B2
(45) Date of Patent: Feb. 19, 2008

(54) SELECTIVELY ILLUMINATED KEY CHAMBERS

(75) Inventors: Majeed D. Salman, Redmond, WA (US); G. Eric Engstrom, Kirkland, WA (US)

(73) Assignee: Varia Mobil LLC, Seattle, WA (US)

( * ) Notice: Subject to any disclaimer, the term of this patent is extended or adjusted under 35 U.S.C. 154(b) by 57 days.

(21) Appl. No.: 11/115,697

(22) Filed: Apr. 27, 2005

(65) Prior Publication Data

US 2006/0245808 A1 Nov. 2, 2006

(51) Int. Cl.
*B41J 5/00* (2006.01)
*G06F 3/02* (2006.01)

(52) U.S. Cl. ............. 400/472; 379/433.07; 341/22

(58) Field of Classification Search ..... 400/472–479.2, 400/478, 490, 491.3, 493; 341/22, 23, 28, 341/31, 34; 379/433.07, 368–370
See application file for complete search history.

(56) References Cited

U.S. PATENT DOCUMENTS

2003/0072595 A1* 4/2003 Al-Safar

2005/0073446 A1* 4/2005 Lazaridis et al.
2006/0018463 A1* 1/2006 Rak et al.

FOREIGN PATENT DOCUMENTS

| JP | 63-177217 A | * | 7/1988 |
| JP | 63-284625 A | * | 11/1988 |
| JP | 05019928 A | * | 1/1993 |
| JP | 06250768 A | * | 9/1994 |

OTHER PUBLICATIONS

English Translation of JP 06250768 A.*
English Translation of JP 05019928 A.*

* cited by examiner

*Primary Examiner*—Daniel J. Colilla
*Assistant Examiner*—N. Ha
(74) *Attorney, Agent, or Firm*—Schwabe, Williamson & Wyatt, P.C.

(57) ABSTRACT

A method and apparatus for facilitating input of data to an electronic device using selectively illuminated chambered keys is disclosed. A determination is made as to which of a plurality of chambers is to be illuminated. An indicia assigned to a region on the surface of the key above a selected chamber is highlighted by illumination(s), that is (are) based at least upon the determination.

24 Claims, 9 Drawing Sheets

SELECTIVELY ILLUMINATED KEY CHAMBERS

FIELD OF THE INVENTION

The present invention relates to the field of electronic devices. More specifically, the present invention relates to the selective illumination of portions of an input mechanism for use in portable electronic devices.

BACKGROUND

Mobile electronic devices have become ubiquitous in today's fast paced society. Various portable or mobile handheld devices can perform multiple tasks as well as provide multiple communication systems. For example, the personal digital assistant ("PDA") cellular telephone, in addition to serving as a personal organizer and cellular phone, may also provide text messaging, paging, and Internet connectivity. Accordingly, most devices require an interface for entering alphabetic as well as numeric characters.

Mobile devices, such as a simple cellular telephone, may include a conventional 12-key telephone keypad (also known as an alphanumeric keypad), having 10 keys associated with the numeric values 0-9 and two additional keys associated with an asterisk and pound symbol. Several methods have evolved for entering text on the telephone keypad, for example, multi-tap or predictive text entry (e.g., T9 Text Input™ by America Online, Inc., of Dulles, Va.). Despite such methods, entering alphabetic characters via a typical 12-key telephone keypad may remain inefficient for users because the inherit multifunction nature of the alphanumeric keys does not allow for easy identification of the selected character. Typically, the user must look at a display that is usually backlit to determine the character selected; however, depending on the ambient light the display may not be clearly visible to the user.

DESCRIPTION OF THE REFERENCED NUMERALS

Similar reference numerals in the drawings denote similar elements throughout the several views; the figures in each of the views illustrate various embodiments of the present invention.

BRIEF DESCRIPTION OF THE DRAWINGS

FIG. 9a illustrates an example of a perspective view of a key with chambers in accordance with an embodiment.

FIG. 9b illustrates an example of a cross sectional view of a key with chambers over controllable outlets of a light pipe in accordance with an embodiment.

DETAILED DESCRIPTION OF THE ILLUSTRATED EMBODIMENTS

Parts of the description will be presented in terms such as portable electronic devices. As will be understood by those skilled in the art, the term "mobile/portable electronic device" as used herein (hereafter, simply "electronic device"), including in the claims, comprise wireless mobile phones, personal digital assistants (PDAs), and other devices of the like.

The term "wireless mobile phone" as used herein refers to the class of telephone devices equipped to enable a user to make and receive calls wirelessly, notwithstanding the user's movement, as long as the user is within the communication reach of a service or base station of a wireless network service provider. Unless specifically excluded, the term "wireless mobile phone" is to include the analog subclass as well as the digital subclass (of all signaling protocols).

In the following description, various aspects of the present invention will be described. However, it will be apparent to those skilled in the art that alternate embodiments may be practiced with only some or all aspects of the present invention. For purposes of explanation, specific numbers, materials and configurations are set forth in order to provide a thorough understanding of the described embodiments. However, it will be apparent to one skilled in the art that alternate embodiments of the present invention may be practiced without the specific details. In other instances, well-known features are omitted or simplified in order not to obscure the described embodiments.

Various operations will be described as multiple discrete steps in turn, in a manner that is most helpful in understanding the present invention, however, the order of description should not be construed to imply that these operations are necessarily order dependent. In particular, these operations need not be performed in the order of presentation.

The phrase "in one embodiment" is used repeatedly. The phrase generally does not refer to the same embodiment, however, it may.

The terms "comprising", "having", and "including" are synonymous, unless the context dictates otherwise.

The terms "keypad" and "keyboard" are synonymous, unless the context dictates otherwise.

The embodiments are described herein with respect to a character set based on the English language. It should be understood that the invention may be practiced with alphanumeric data as well as characters of other languages.

While the present invention is described with respect to its improvement over an alphanumeric keypad, one of ordinary skill in the art will recognized that the present invention may be practiced with respect to other keyboard layouts, such as a miniaturized Dvorak keyboard, a QWERTY keyboard, or a reduced keypad for multi-tap input described in co-pending application PCT/US05/05054.

Figure 1:
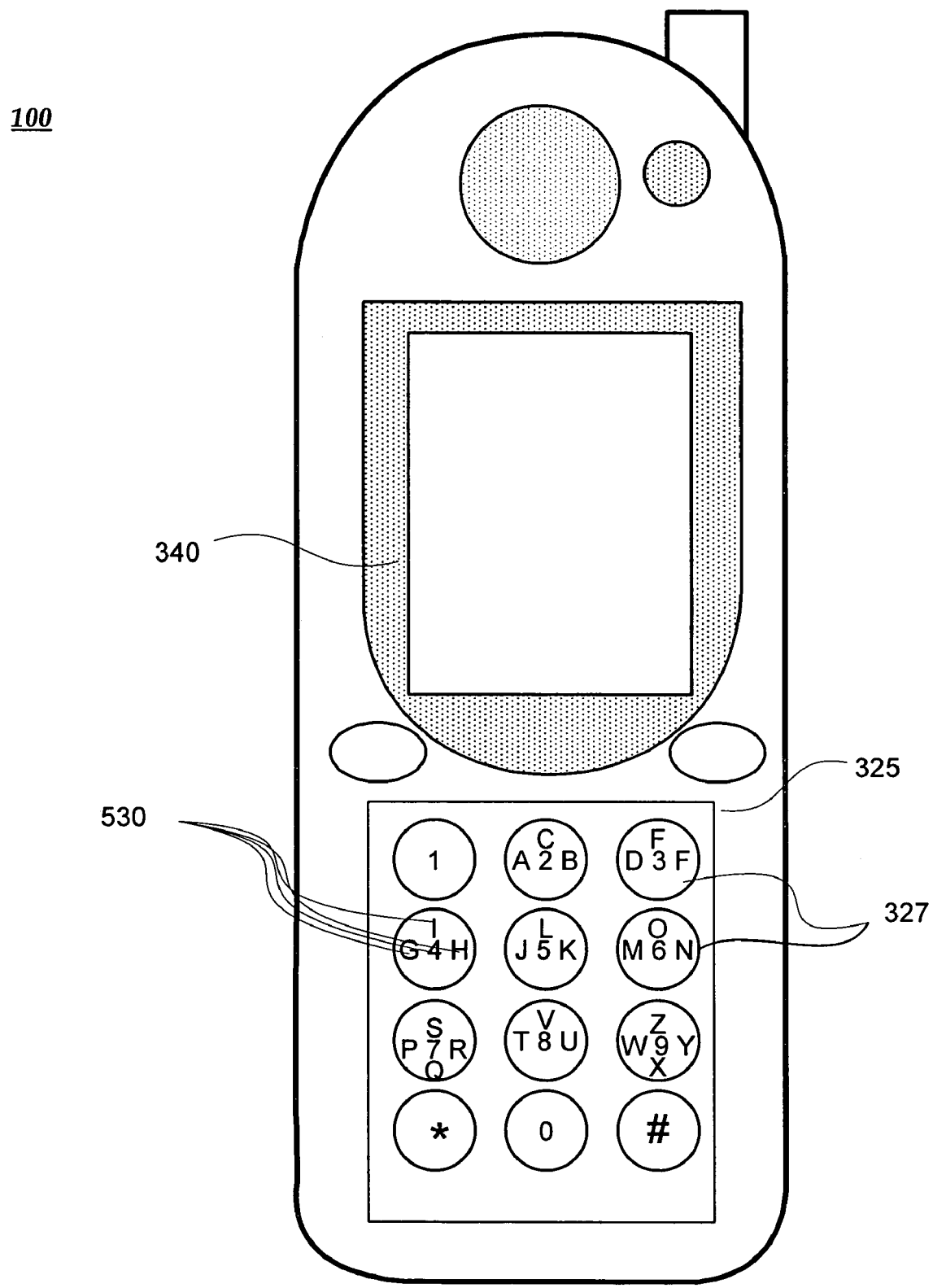
FIG. 1 illustrates a portable electronic device utilizing an alphanumeric keypad for inputting data in accordance an one embodiment.

FIG. 1 illustrates an electronic device 100, in this case a wireless mobile phone, utilizing a keypad 325 with keys 327 providing character input for the electronic device 100 in accordance with one embodiment of the present invention. Each key on the keyboard 325 may have associated with it multiple character values (e.g., keys are overlaid with multiple indicia 530 representing character values). As described in greater detail below, the present invention disposes these indicia 530 over corresponding regions of a top surface of the key 327. Underneath the regions are corresponding internal chambers 502a-502e (shown and described in greater detail in conjunction with FIG. 5), and each of the chambers can be selectively illuminated to advantageously highlight the selection of a character represented by corresponding indicia 530. The method of practicing this invention may be combined with any suitable method of determining which character values will be assigned to various key activations. The terms "character" or "character values" as used herein include all alphanumeric (such as a, b, c . . . , 1, 2, 3 . . . ), punctuation (such as ";", ":" . . . ), symbols (such as "$" . . . ), and so forth, of all languages. However, for ease of understanding, the remaining descriptions and examples will be presented using "characters" of the English language, but this should not be construed as limiting to the invention.

"Activation" means an affirmative action by a user to provide a character value associated with a key as input to the electronic device. Key activations may include a traditional mechanical key that, when pressed, causes the key to contact a switch on a circuit board located beneath the key. Alternatively, key activations may mean the touching by a user of a pressure sensitive key or an electronically sensitive key. Thus, "activation" is to be broadly interpreted.

As mentioned above, the selectively illuminated key chamber(s) 502a-502e advantageously can provide an illuminated indication of a selected character. This allows a selection of the character without reference to display 340. As discussed above, when a user tries to key input data on a typical keyboard with only a back lit display 340, poor illumination of the display or less than optimal ambient lighting can cause an incorrect character to be selected, resulting in erroneous data input. Thus, a keyboard with a selectively illuminated key chamber(s) facilitates easier, less error prone user interaction by allowing for selection of a character without reference to the display 340.

Figure 2:
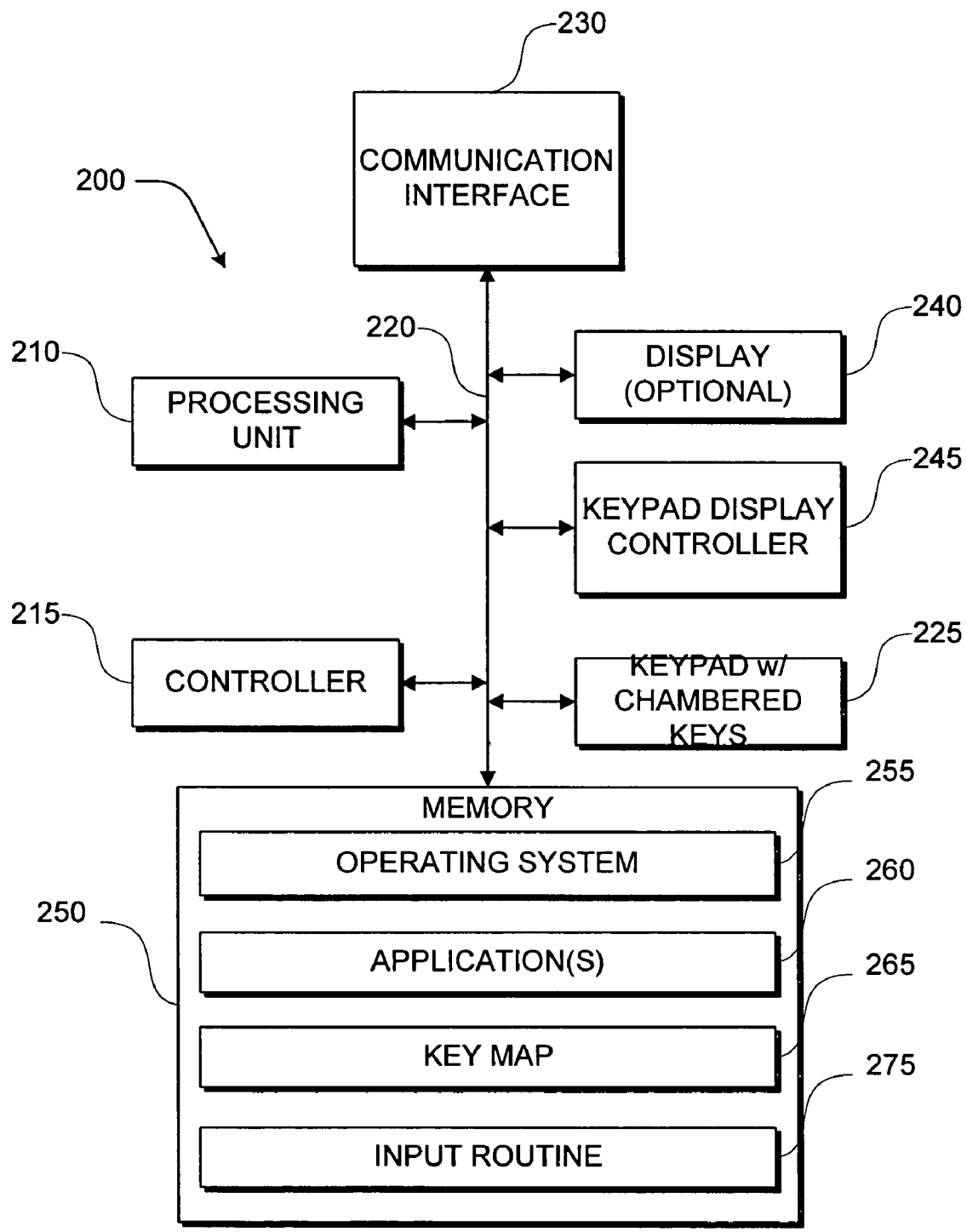
FIG. 2 illustrates a block diagram view of a computing environment, in accordance with an embodiment.

Referring now to FIG. 2, wherein an exemplary electronic device 200 suitable for use in embodiments of the present invention is shown. Those of ordinary skill in the art and others will appreciate that electronic device 200 may include many more components than those shown in FIG. 2. However, it is not necessary that all of these generally conventional components be shown in order to disclose an enabling embodiment for practicing the present invention. As shown in FIG. 2, electronic device 200 includes an optional communications interface 230 for connecting to remote device(s) (not shown). Communications interface 230 includes the necessary circuitry, driver and/or transceiver for such a connection and is constructed for use with the appropriate protocols for such a connection.

Electronic device 200 also includes a processor or processing unit 210, a controller 215, a keypad with chambered keys 225 in accordance with embodiments of the present invention, a display 240, a keypad display control 245 in accordance with embodiments of the present invention, and a memory 250, all interconnected along with the communications interface 230 via a bus 220. Memory 250 generally comprises random access memory ("RAM"), a read only memory ("ROM"), and a permanent mass storage device, such as a disk drive, flash RAM, or the like. Memory 250 stores an operating system 255, a key map 265, and an input method routine 275.

In various embodiments, memory 250 also stores application(s) 260. It will be appreciated by those of ordinary skill in the art and others, that while key map 265, input routine 275 and applications 260 are described as separate individual software components, they may actually be combined, comprised of multiple software components; or may in fact be sub-parts of one or more integrated software components. In particular, input routine 275 may be integrated with applications 260 or operating system 255. Additionally, while key map 265 and input routine 275 are illustrated as software components (e.g., part of the operating system, or a discrete application), in alternate embodiments, they may be hardware components of electronic device 200.

It will be appreciated that the software components may be loaded from a computer readable medium into the memory 250 of the host computer or electronic device 200 using a drive mechanism (not shown) or network mechanism (not shown) associated with the computer readable medium, such as a floppy, tape, DVD/CD-ROM drive, flash RAM, network interface card, or communications interface 230.

Further, communication interface 230 may be designed to support one or more signaling protocols, including but not limited to Code Division Multiple Access ("CDMA"), Time Division Multiple Access ("TDMA"), Global System for Mobile Communications ("GSM"), General Packet Radio Service ("GPRS") and so forth. Moreover, communication interface 230 may be implemented using a separate transmitter and receiver.

Electronic device 200 contains a keypad with chambered keys 225 for providing input to electronic device 200. In accordance with the present invention, each input key on keypad 225 may contain selectively illuminated chambers beneath regions of the surface of the input key. In some embodiments, keypad display controller 245 controls the selected illumination of the chambers. Each of those regions may have indicia correspondingly disposed thereon. Additionally, the indicia may be associated with one or more character values defined by the key map 265.

Figure 3:
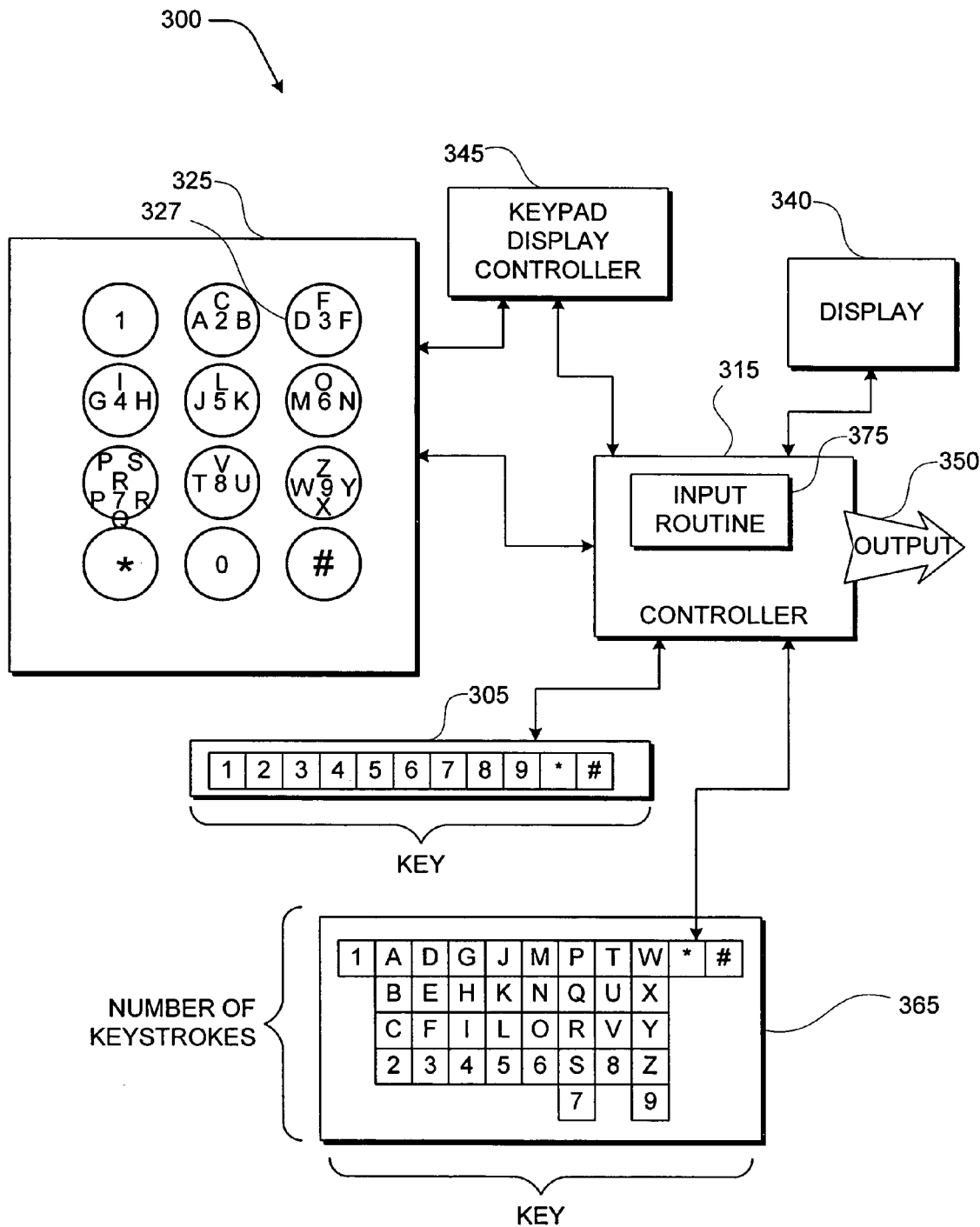
FIG. 3 illustrates a block diagram view of a keypad environment, in accordance with an embodiment.

FIG. 3 is a functional block diagram illustrating an input assembly 300 of an electronic device 300 corresponding to the keypad having chambered input keys of FIG. 2 in a "multi-tap" input mode. As alluded to earlier, for the illustrated embodiment, electronic device 300 is a wireless mobile phone; however, for other embodiments, electronic device 300 may be another electronic device, including but not limited to PDAs.

In FIG. 3, a controller 315 (either a hardware or software controller) operates in conjunction with an input routine 375 in support of keypad 325. Input routine 375 may have a multi-tap input subroutine (to be discussed in conjunction with FIG. 5). Input assembly 300 has an output 350 coupled to controller 315. As one example, when controller 315 is operating in multi-tap input mode, controller 315 detects each input key activation and the amount of time that has passed since the most recent input key activation, or the length of time between input key activations. A memory is coupled to controller 315 and stores a numeric key mapping 305 and an alphanumeric key mapping 365, which include the assignments between the physical input keys, the number of times an input key is activated, and the corresponding characters. Controller 315 then provides an output signal to output 350, the output signal indicating the character selected by the user. In one embodiment, successive selected characters are stored in a memory and become a generated text string.

In one embodiment in accordance with the present invention, a keypad display controller 345 is coupled to controller 315. An output signal for controller 315 can communicate with keypad display controller 345. Keypad display controller 345 in turn can cause appropriate chambers in the keys to illuminate to highlight an appropriate alphabetic, numeric or non-numeric character indicia on a corresponding region of an input key 327 contained in keypad 325. In an alternate embodiment, keypad display controller 345 can be integrated and made a part of controller 315. In one embodiment, as the user repeatedly activates an input key 327 and has not completed selection of a character, each successive activation causes a tentative character selection indicated by corresponding indicia, highlighted by the illumination of appropriate chambers, on the input key 327 to replace the previous tentative character selection so indicated on the input key 327.

In one embodiment, a display 340 is coupled to controller 315. In another embodiment, an output signal for controller 315 causes an appropriate alphabetic, numeric or non-numeric character to be displayed on display 340. In yet another embodiment, as the user repeatedly activates an input key 327 and has not completed selection of a character, each successive activation causes a tentative character selection to overwrite the previous tentative character selection on display 340.

Figure 4:
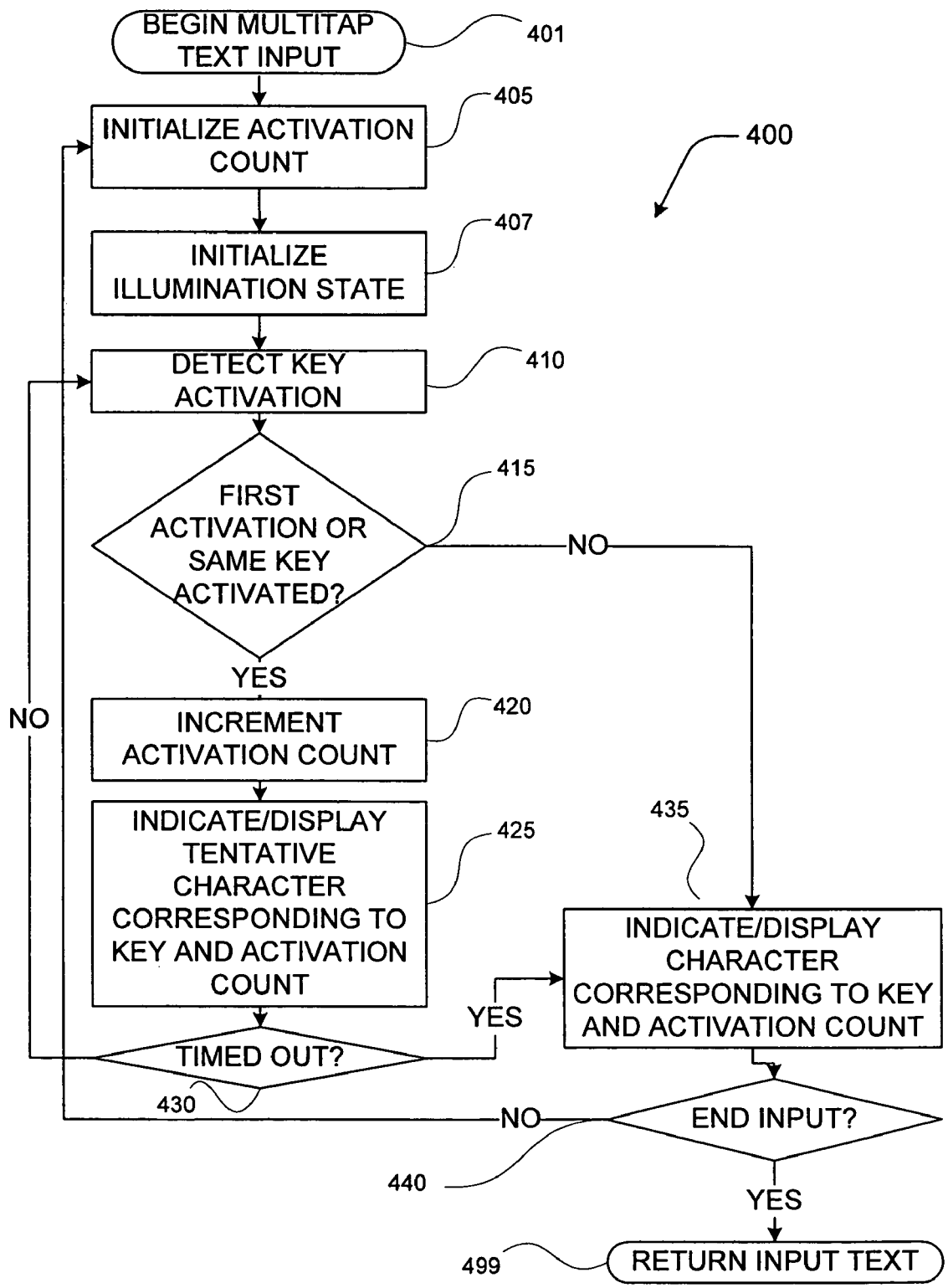
FIG. 4 illustrates a flow diagram of a multi-tap input subroutine, in accordance with an embodiment.

FIG. 4 illustrates an exemplary process 400 associated with a multi-tap input subroutine for determining a selected character using multi-tap input. In the embodiment, "character" may refer to an alphabetic, numeric, non-alphabetic or non-numeric character or value. The process 400 starts at box 401. At step 405 an activation count corresponding to a current character selection is initialized to zero. At step 407, keypad display controller 245 sets the input keys' chambers to an initialized illumination state. In one embodiment, the initialized illumination state may comprise illumination of all chambers in all keys. In another embodiment, the initialized illumination state may comprise illumination of no chambers in all keys. In yet another embodiment, the initialized illumination state may comprise illumination of one chamber in at least some of the keys. At step 410, the controller 215 detects an input key activation has occurred. The controller 215 saves an identifier designating the input key that has been activated. At decision block 415 a determination is made whether the activation is the first activation or a reactivation of the same input key, or whether the activation is of a new key after a previous activation of another input key. If the activation was the first activation or a reactivation of the same input key, then processing returns to step 420 where the controller 215 increments the activation count. Control flow proceeds to step 425 where indicia on the input key indicates a tentative character selection corresponding to the combination of input key and activation count is highlighted by illumination of appropriate chambers in the input key. In another embodiment, the tentative character selection may also be indicated on display 240.

The indicia highlighted/character to display at step 425 is determined by using alphanumeric key map 265 or numeric key map 305 that associates each character with a corresponding unique combination of data input key and activation count. After indicating/displaying a tentative character selection at step 425, a determination is made in decision block 430 whether a next input key activation is made prior to a predetermined timeout threshold elapsing between the prior key activation detection 410 and a next input key activation detection. If a period of time equal to or greater than the predetermined timeout threshold occurs, character selection is complete and flow proceeds to step 435.

If a next input key activation is made prior to the timeout threshold occurring, however, flow control loops to step 410. The steps as described above then repeat. On second and subsequent passes through the sequence of steps 410-430, at the step 415 the determination of whether a different input key has been activated may be positive. If this is true, flow control moves to step 435 where the character selection is complete. In this situation, after step 435 and associated processing of the character selection are completed and the tentative character selection becomes the actual character selection, the process 400 starts again for the new character selection 405 unless, in determination step 440, an end to the input is detected. In which case, processing ends at block 499 with a return of the input text to a calling routine.

Figure 5A:
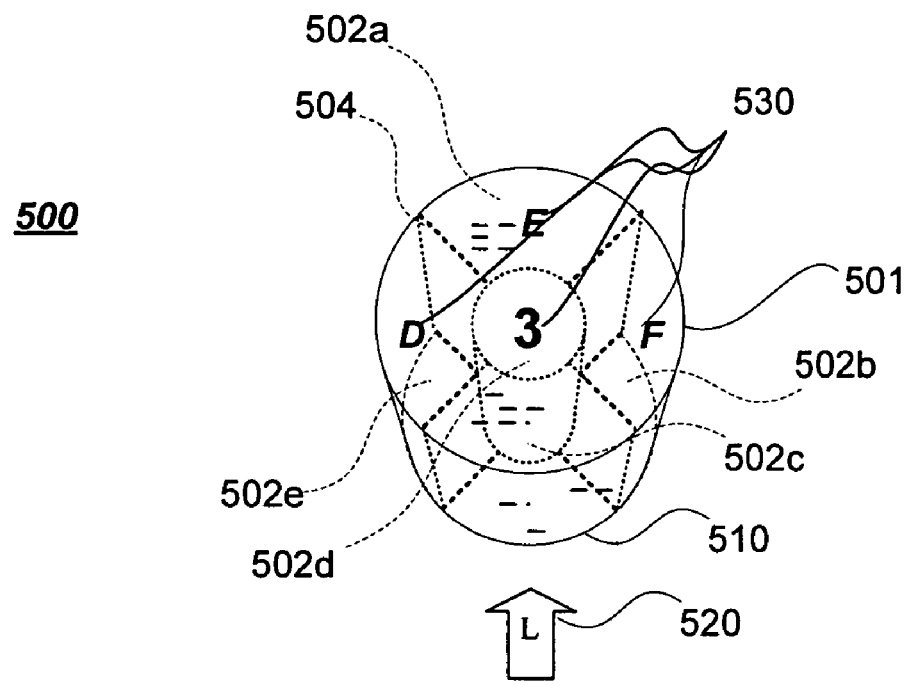
FIG. 5a illustrates an example of a perspective view of a key with chambers in accordance with an embodiment.
Figure 5B:
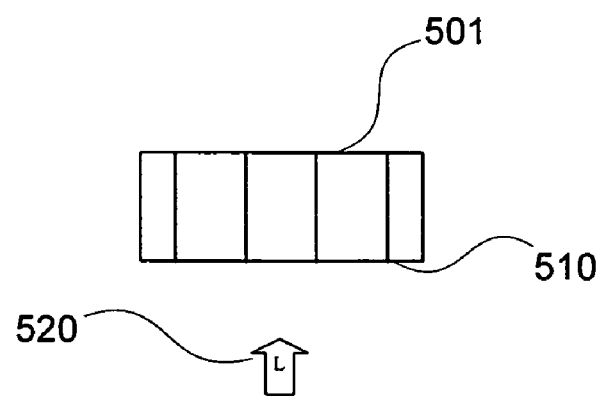
FIG. 5b illustrates an example of a cross sectional view of a key with chambers in accordance with an embodiment.

Referring now to FIGS. 5a-5b, which illustrate a "see through" perspective and side view of a single key 500 corresponding to key 327 selected from the keypad 325 illustrated in FIGS. 1 and 3 for an embodiment of the present invention. Only one key 327 is described for ease of understanding. However, this description may be applicable to each of the keys in FIG. 1. Key 500 has a top surface 501, a key bottom 510, and an interior cavity. This cavity is divided into several chambers 502a-502e by a plurality of ribs 504. These chambers 502a-502e are correspondingly disposed underneath the various regions of the top surface 501. A plurality of indicia 530 may in turn be correspondingly disposed on some or all of those regions. For the embodiment illustrated in FIG. 5b, a cross sectional view of key 500 is shown where light source 520 is optically coupled to the chambers 502a-502e to selectively illuminate one or more of the chambers 502a-502e. In one embodiment, light source 520 may comprise a plurality of light sources 520 while, in another embodiment, light source 520 may comprise only one light source. Similarly, in one embodiment, a single light source may be coupled to an individual chamber from the group of chambers 502a-502e for the key 500. Alternately, more than one light source 520 may be correspondingly coupled to the chambers 502a-502e. For several embodiments, the exterior top surface 501 is fabricated from a transparent or a substantially transparent material and the indicia 530 are either opaque and/or colored.

In one embodiment, there may be four character values corresponding to each of indicia 530 associated with key 500. That is to say, when a user presses a key 500, one of the four associated character values can be assigned to the key 500 pressed. In the embodiment shown, the letters printed on the surface of the key (indicia) indicate these multiple assignments. Thus, for example, key 500 may be associated with or have assigned to it a "3", "D", "L" and an "F" character. By determining which of the four character values associated with key 500 may be/will be input to the device, the electronic device 100 can determine which of the plurality of chambers 502a-500e would be appropriate to illuminate. In one embodiment, wherein the indicia 530 are opaque, the electronic device 100 determines that exactly one of the chambers 502a-502e will be illuminated to indicate the selection or tentative selection of a character.

In another embodiment, wherein the indicia 530 are transparent, the electronic device 100 determines that exactly one of the chambers 502a-502e will not be illuminated to indicate the selection or tentative selection of a character. For example, if the transparent indicia 530 are disposed on a red exterior surface, and the light source 520 illuminating all but one of the chambers red, the indicia 530 on the unlit chamber may stand out in relief because the other indicia 530 are visibly blurred out by the illumination.

Figure 6:
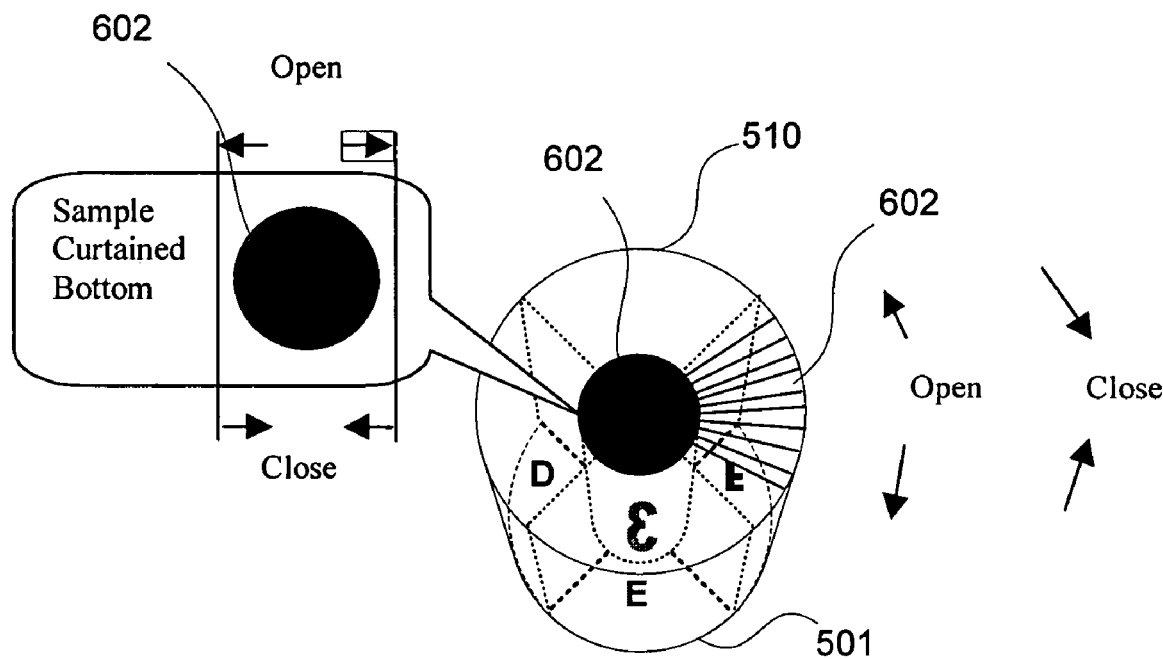
FIG. 6 illustrates an example of a perspective view of a key with a mini-curtain at the bottom of a key with chambers in accordance with an embodiment.

FIG. 6 illustrates an embodiment of the present invention wherein each of the chambers 502a-502e of the key 500, corresponding to key 500 illustrated in FIG. 5a, may have a bottom surface 602 that has at least two states. A first state corresponds to an open state that allows illumination of the chamber(s) 502a-502e by the light source 520. A second state corresponds to a closed state that prevents illumination of the chamber by the light source. This bottom surface can comprise mini-curtains. Keypad display controller 345 may control the open and closed states of the mini-curtain. In various embodiments, the mini-curtains are electrostatically controlled. The keypad display controller 345 may include memory having instructions and a CPU for executing those instructions complementary to the open and closed states. In one embodiment, determining the appropriate chamber from chambers 502a-502e to illuminate may simply comprise illuminating exactly one chamber with an indicia disposed above it. In another embodiment, the determining and illuminating are performed responsive to the key 500 being selected/activated. The illuminating can be accomplished by instructing/causing the mini-curtain, located at a corresponding key bottom surface 510 beneath the chamber, to transition into the open state.

Figure 7A:
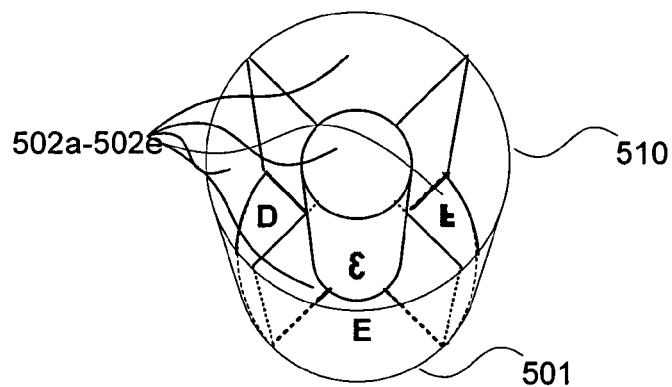
FIG. 7a illustrates an example of a perspective view of a key with chambers in accordance with an embodiment.
Figure 7B:
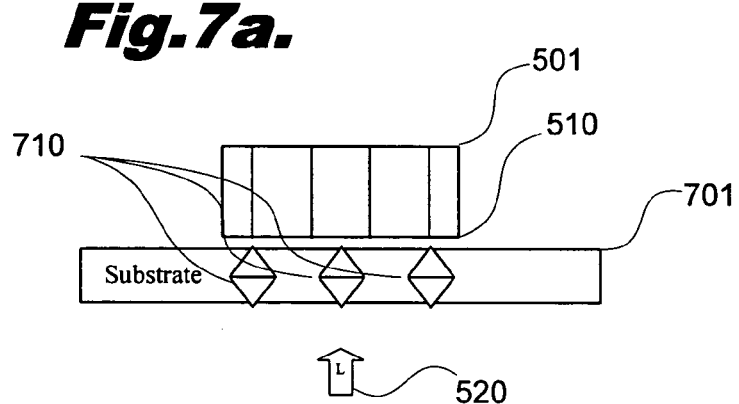
FIG. 7b illustrates an example of a cross sectional view of a key with chambers over a substrate with light valves in accordance with an embodiment.
Figure 7C:
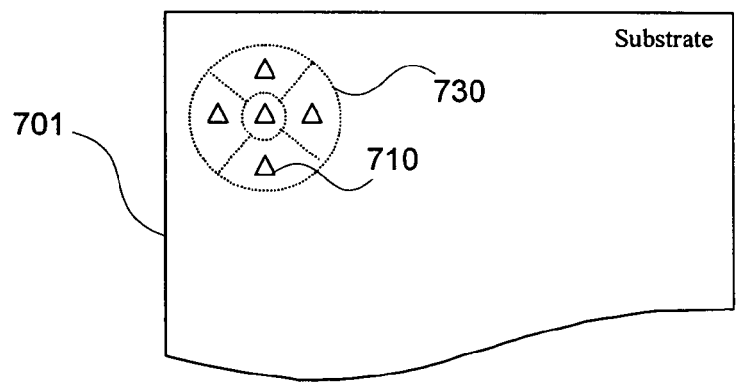
FIG. 7c illustrates an example of a plan view of a key with chambers over a substrate with light valves in accordance with one embodiment.

FIGS. 7a-7c illustrate an embodiment of the present invention wherein, unlike the embodiment described above, the key bottom 510 is open/uncovered exposing each of the chambers 502a-502e to the light sources 520. In an alternate embodiment, the chambers 502a-502e may be enclosed with a transparent surface. FIG. 7b illustrates a cross sectional view of the key 500 as shown in FIG. 7a. The key 500 can be disposed over a substrate 701. This substrate can have light valves 710 that are correspondingly disposed under the key's 500 chambers 502a-502e. FIG. 7c illustrates a plan view of this embodiment. Key footprint 730 indicates where each of the chambers 502a-502e are disposed as well as the relative deposition of the light valves 710 on the substrate 701. A keypad display controller can be used to control the activation of the light valves to regulate the illumination of various chambers 502a-502e.

In one embodiment, determining the appropriate chamber from chambers 502a-502e to illuminate may simply comprise illuminating exactly one chamber with an indicia disposed above it. In another embodiment, the determining and illuminating are performed responsive to the key 500 being selected/activated. The illuminating can be accomplished by instructing/causing a light valve 710, located at a corresponding region of the substrate 701 beneath the chamber, to transition into an open state.

Figure 8A:
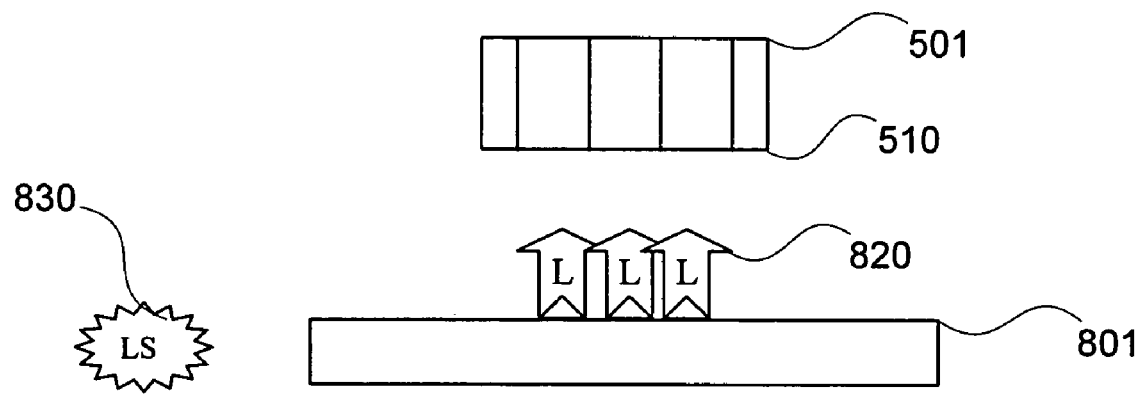
FIG. 8a illustrates an example of a cross sectional view of a key with chambers over controllable outlets of a light pipe in accordance with an embodiment.

FIG. 8a illustrates a cross sectional view of the key 500 described in the embodiment of FIG. 7a. For this embodiment, controllable outlets 820 (light valves) of a light pipe 801 are disposed beneath key chambers 502a-502e. In one embodiment, a common light source 830 for all keys 500 (corresponding to keys 327 on keypad 325 in FIGS. 1 and 3) may be employed. In another embodiment, a separate common light source 830 for each corresponding key may be employed. The light sources may be of any color. A key display controller 345 can be used to control the activation of the light valves 820 to regulate the illumination of various chambers 502a-502e.

Figure 8B:
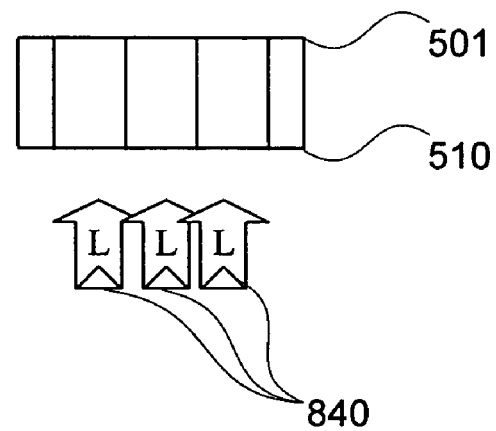
FIG. 8b illustrates an example of a cross sectional view of a key with chambers over controllable light sources in accordance with an embodiment.

FIG. 8b, like FIG. 8a, illustrates a cross section view of key 500 described in the embodiment of FIG. 7a. However, for this embodiment, multiple light sources of any color can be correspondingly coupled to chambers 502a-502e of the key 500, wherein one light source 840 per chamber 502a-502e may be employed. Any suitable light source 840, for example Light Emitting Diodes, can be used. A key display controller 345 can be used to control the activation of the light sources 840 to regulate the illumination of various chambers 502a-502e in accordance with the present invention.

FIGS. 9a-9d illustrate an embodiment where the key indicia 530 are transparent and the key top surface 501 is opaque and preferably colored. A plurality of light sources 920 may be used for each of the chambers 502a-502e of the key 500. For an embodiment, like the key 500 illustrated in FIG. 7b, FIG. 9b the key bottom 510 of FIG. 1 is open/uncovered exposing each of the chambers 502a-502e to the light sources 930 illustrated in the embodiment shown in FIG. 9c or the light sources 940 illustrated in the embodiment shown in FIG. 9d depending on the embodiment of the invention employed. Alternately in another embodiment, key bottom 510 may be covered by a transparent or substantially transparent material.

In one embodiment, indication of the selection of an indicia 530 may be accomplished by selecting one chamber from 502a-502e and illuminating just that one chamber. In another embodiment, the remaining unselected chambers can also be illuminated; however, the color of the light sources 930 illuminating the non-selected chambers should match the color of the top surface of the key 501 while the color of the light illuminating the selected chamber may be of a different color. Then, the indicia 530 for the unselected chambers can blend in with the top surface 501 of the key.

Figure 9C:
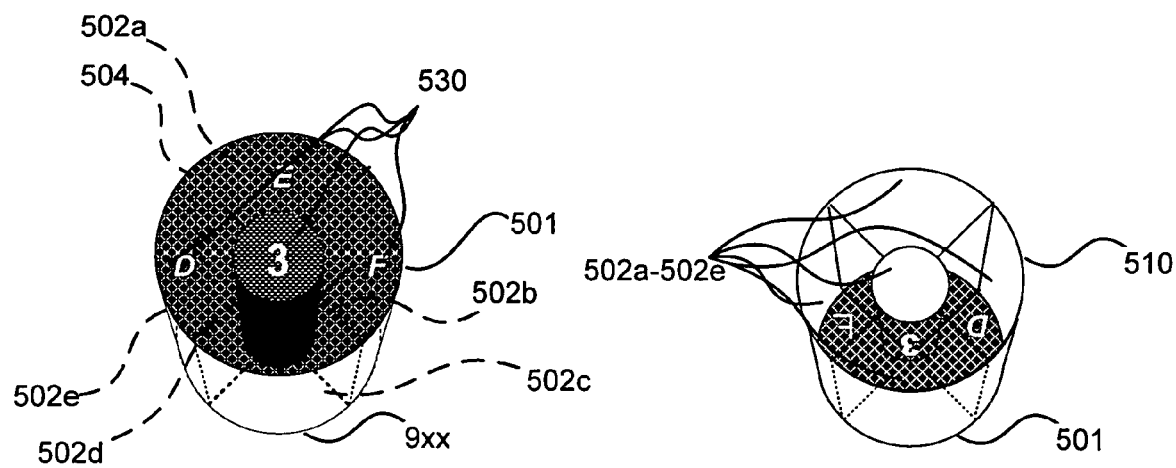
FIG. 9c illustrates an example of a cross sectional view of a key with chambers over controllable light sources in accordance with an embodiment.
Figure 9C:
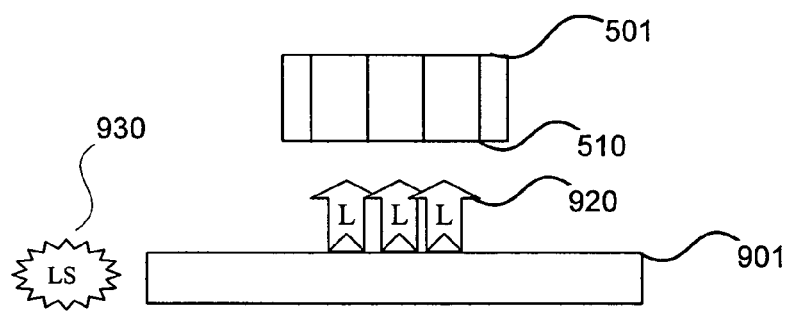

FIG. 9c illustrates a cross section view of key 500 in an exemplary embodiment of the present invention, wherein the common light source 930 may represent one or more common light sources. At least two of the common light sources 930 may be optically coupled to one or more light pipes 901 that have two or more controllable outlets 920 (light valves) coupled to each one of the chambers 502a-502e. One of the light sources 930 may be red (where the top surface 501 of the key 500 is the same color red). Another of the light sources 930 may be white, where the white light illuminates appropriate chamber to indicate the selection of a character. In an alternate embodiment, only one light source 930 per light pipe 901 may be used, while in another embodiment more than one light source 930 per light pipe 901 may be employed.

Figure 9D:
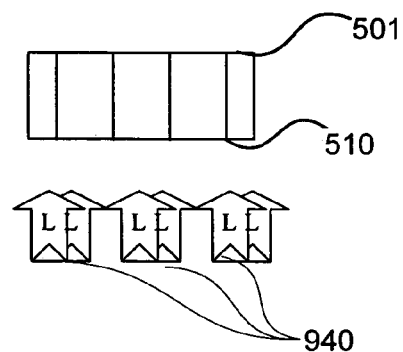
FIG. 9d illustrates an example of a cross sectional view of a key with chambers directly over controllable light sources in accordance with an embodiment

FIG. 9d illustrates a cross section view of key 500 in an exemplary embodiment of the present invention, wherein the common light source 940 may represent two or more common light sources directly coupled to each one of the chambers 502a-502e. These light sources may comprise Light Emitting Diodes capable of emitting a variety of colors.

In one embodiment, wherein the indicia 530 are transparent and the regions on the key top surface 501 are formed from substantially opaque materials, the electronic device 100 determines that exactly one of the chambers 502a-502e will not be illuminated to indicate the selection or tentative selection of a character. For example, if the opaque regions are red, and one of the colors for light sources 940 illuminating all but one of the chambers is also red, the indicia 530 on the unlit chamber may stand out in relief thereby indicating the selection of the unlit chamber. "Illuminating" can be as simple as turning on a light source. Alternately for other embodiments, "illuminating" may comprise causing a light valve 920 beneath the key bottom 510 of an appropriate one of the chambers 502a-502e to transition to an open state.

In the interest of clarity, only one input key 327/500, one set of first set of indicia 530, and one set of second set of alphabetic values "D, E, and F" have been labeled in a number of the figures. Furthermore, please note that in the embodiment shown, although input keys 327 have been illustrated in a typical telephone keypad layout, in alternate embodiments input keys 327 may be disposed in alternate layouts to facilitate the formation of the modified QWERTY keyboard layout or other suitable layout. In another embodiment, another suitable layout may include a modified Dvorak keyboard layout, or a combination keyboard wherein the keyboard is oriented in one direction relative to the user, a QWERTY or semi-QWERTY keyboard or other keyboard layout is available to the user for input; while, when the keyboard is oriented in a second direction relative to the user, a subset of the keys representing the typical telephonic keypad is available to the user for input.

Additionally, as noted previously, in various embodiments a first plurality of input keys 327 may include one or more input keys associated with one or more non-alphabetic or non-numeric values and have indicia correspondingly indicating the same. Examples of such associated values include but are not limited to, punctuation marks, special symbols or characters, device commands or other suitable values. In one embodiment, device command values may include function keys, cursor-control keys, or modifier keys.

Note also that, although in FIG. 1 each of first and second sets of alphanumeric and non-alphanumeric values represented by indicia 530 are displayed on particular portions of the input keys 327 (i.e., upper, lower, central portions), in alternate embodiments the values may be displayed on varying portions of the input keys. Also, note that in alternate embodiments input keys 327 may be associated with more or fewer indicia and are not limited to the specific associated values as shown in FIG. 1. As will be appreciated by those of ordinary skill in the art, while one process or procedure may be described with one figure or set of figures, the process or procedure can apply to any suitably configured keys and illumination sources that may be represented to other figures.

Similarly, while the keys 327/500 are illustrated in terms of circular/cylindrical dimensions, keys of other suitable shapes (e.g., quadrilateral/cube type shapes) and dimensions may also be used to practice this invention.

Those of ordinary skill in the art will appreciate that exemplary keypad 325 is shown by way of illustration, and is not meant to limit the scope of the present invention.

It will be appreciated that, although particular embodiments of the invention has been described in detail, various modifications and improvements can be made by a person skilled in the art without departing from the scope of the present invention. It will also be appreciated that the frequency of use of letters varies in situations where users predominately use languages other than English, or where geographical or cultural differences result in different corpuses of use. In these situations, ordered sets other than those explicitly described, in accordance with the present invention, may be desirable.

What is claimed is:

1. An apparatus comprising:
a keypad having a plurality of keys, at least one of the keys having an exterior top surface and an interior cavity disposed underneath the exterior top surface, with the exterior top surface of the key having a plurality of regions and a plurality of indicia correspondingly disposed thereon, and the interior cavity having a plurality of ribs partitioning the interior cavity into a plurality of chambers correspondingly disposed underneath the regions; and
at least one light source optically coupled to the chambers, to selectively illuminate one or more of the chambers, said selective illumination indicating a tentative user selection of a character corresponding to a one of the plurality of indicia.

2. The apparatus of claim 1, wherein the exterior top surface comprises a substantially transparent material, and the indicia correspondingly disposed thereon are either opaque or colored.

3. The apparatus of claim 1, wherein the exterior top surface comprises a substantially transparent material, and areas of each of the exterior top surface not occupied by the indicia are either opaque or colored.

4. The apparatus of claim 1, wherein each of the chambers has a bottom surface, having a first state that allows illumination of the chamber, and a second state that prevents illumination of the chamber.

5. The apparatus of claim 4, wherein each of the bottom surfaces comprises a mini-curtain operable in at least an open state to allow light into the corresponding chamber, and a closed state to prevent light from entering into the corresponding chamber.

6. The apparatus of claim 4, further comprising a keypad display controller adapted to control the state of each of the bottom surfaces.

7. The apparatus of claim 1, wherein the at least one light source comprises at least a plurality of light sources optically coupled to the chambers correspondingly.

8. The apparatus of claim 7, further comprising a keypad display controller coupled to the light sources to control the light sources to selectively illuminate one or more of the chambers.

9. The apparatus of claim 1, wherein the apparatus further comprises a substrate, on which the keys are disposed, having a plurality of light valves correspondingly disposed under the plurality of chambers.

10. The apparatus of claim 9, further comprising a keypad display controller coupled to the light valves to control the light valves.

11. The apparatus of claim 1, wherein the apparatus further comprises at least one light pipe having a plurality of controllable outlets, correspondingly disposed under the plurality of chambers, and coupled to the at least one light source.

12. The apparatus of claim 1, wherein the at least one light source comprises a plurality of light sources optically coupled to the chambers correspondingly.

13. The apparatus of claim 12, wherein the plurality of light sources comprises light emitting diodes.

14. The apparatus of claim 12, wherein the apparatus farther comprises a keypad display controller coupled to the light sources to control the light sources.

15. The apparatus of claim 1, wherein the apparatus is a selected one of a wireless mobile phone and a personal digital assistant.

16. A method of operation to facilitate data input into a device, comprising:
   determining, responsive to a user actuation of a key, which of a plurality of chambers disposed underneath a corresponding plurality of regions of a surface of the key of a keypad of the device, is/are to be illuminated to indicate a tentative user selection of a character corresponding to a one of a plurality of indicia disposed on the regions of the surface; and
   illuminating the appropriate one(s) of the plurality of chambers.

17. The method of claim 16, wherein the regions comprise substantially transparent materials, the indicia are opaque, and the determining comprises determining exactly one of the plurality of chambers to be illuminated.

18. The method of claim 16, wherein the regions comprise substantially opaque materials, the indicia are substantially transparent, and the determining comprises determining exactly one of the plurality of chambers to be illuminated.

19. The method of claim 16, wherein the regions comprise substantially transparent materials, the indicia are opaque, and the determining comprises determining exactly one of the plurality of chambers not to be illuminated.

20. The method of claim 16, wherein the regions comprise substantially opaque materials, the indicia are substantially transparent, and the determining comprises determining exactly one of the plurality of chambers not to be illuminated.

21. The method of claim 16, wherein said illuminating comprises turning on a light source.

22. The method of claim 16, wherein said illuminating comprises causing a light valve disposed at a bottom surface of an appropriate one of the plurality of chambers to transition into an open state.

23. The method of claim 16, wherein said illuminating comprises causing a light valve disposed at a corresponding region of a substance on which the key is disposed to transition into an open state.

24. The method of claim 16, wherein said illuminating comprises causing a light valve disposed at an end of a light to transition into an open state.

* * * * *